United States Patent
Hall et al.

(10) Patent No.: US 6,597,221 B2
(45) Date of Patent: Jul. 22, 2003

(54) POWER CONVERTER CIRCUIT AND METHOD FOR CONTROLLING

(75) Inventors: Jefferson W. Hall, Phoenix, AZ (US); Jade H. Alberkrack, Tempe, AZ (US)

(73) Assignee: Semiconductor Components Industries LLC, Phoenix, AZ (US)

( * ) Notice: Subject to any disclaimer, the term of this patent is extended or adjusted under 35 U.S.C. 154(b) by 13 days.

(21) Appl. No.: 10/184,539

(22) Filed: Jun. 28, 2002

(65) Prior Publication Data

US 2002/0163371 A1 Nov. 7, 2002

Related U.S. Application Data

(62) Division of application No. 09/210,698, filed on Dec. 14, 1998, now Pat. No. 6,429,709.

(51) Int. Cl.[7] ............................................. H03K 3/017
(52) U.S. Cl. ................................................... 327/175
(58) Field of Search ............................. 327/172–176, 327/336, 345, 564–566, 52, 54, 56, 58–60, 73, 87–89

(56) References Cited

U.S. PATENT DOCUMENTS

| | | | | |
|---|---|---|---|---|
| 4,859,937 A | * | 8/1989 | Milkovic | 324/142 |
| 5,838,181 A | * | 11/1998 | Hesterman | 327/172 |
| 6,107,850 A | * | 8/2000 | Shimizu | 327/159 |
| 6,229,366 B1 | * | 5/2001 | Balakirshnan et al. | 327/143 |

* cited by examiner

Primary Examiner—My-Trang Nu Ton
(74) Attorney, Agent, or Firm—James J. Stipanuk

(57) ABSTRACT

A power converter circuit (23) and a method for controlling current in a transformer (16). The power converter circuit (23) includes a controller circuit (60), a duty cycle detector circuit (61), a soft start circuit (62), and a switch (63). The switch (63) controls the current in the transformer (16). The controller circuit (60) cooperates with the soft start circuit (62) to alter the duty cycle of the switch (63). During initial start-up, the switch (63) operates at a minimum duty cycle and increases towards a maximum duty cycle to prevent transformer (16) saturation and potential failure of the switch (63). In addition, the duty cycle detector circuit (61) alters the frequency at which the switch (63) turns on and off to reduce the power consumption of the power converter circuit (23).

18 Claims, 2 Drawing Sheets

POWER CONVERTER CIRCUIT AND METHOD FOR CONTROLLING

Divisional of prior U.S. application Ser. No. 09/210,698, filed on Dec. 14, 1998 now U.S. Pat. No. 6,429,709, having U.S. Examiner My Trang Ton, in Group Art Unit 2816.

FIELD OF THE INVENTION

The present invention relates, in general, to integrated circuits and, more particularly, to power converter integrated circuits.

BACKGROUND OF THE INVENTION

Power supplies typically employ rectifier circuits and a power transformer for generating Direct Current (DC) voltage from an Alternating Current (AC) voltage source. Usually, a first rectifier circuit is connected across a primary winding of the power transformer. The first rectifier circuit receives the AC voltage and provides a rectified voltage to the primary winding. A second rectifier circuit is connected across a secondary winding of the power transformer and provides a DC output voltage. The DC output voltage can be used for supplying operating power to electronic applications such as computers, televisions, printers, battery chargers, etc.

Generally, a feedback circuit is coupled to the power supply in order to regulate the DC output voltage. The feedback circuit includes a power switch connected to the primary winding and a pulse width modulator for operating the power switch. The pulse width modulator sends a gate signal to the power switch to turn the power switch on and off. When the switch is turned on and off, the energy stored in the primary winding is modulated which controls the DC output voltage.

The DC output voltage is used to change the duty cycle of the gate signal. Thus, the DC output voltage provides feedback to the power switch for regulating the DC output voltage to a desired DC voltage level.

One problem with switching regulated power supplies is the potential failure of the power switch when the power supply is initially powered up. During initial power-up or start-up, a capacitive load at the output of the power supply is charged to some desired voltage level from an initial discharged state. Typically, the power switch is turned on for a large percentage of the time in order to increase the DC output voltage. In other words, the gate signal is at a maximum duty cycle where the widths of the pulses are relatively long and the power switch stays on longer during each cycle of the gate signal. This may cause the power transformer to saturate and the power switch to be electrically or thermally stressed resulting in the failure of the power switch during start-up.

Accordingly, it would be advantageous to have a power supply and method for operating the power supply that prevents failure of the power switch during initial start-up. It would be of further advantage to have a power supply and method that reduces the amount of time that the power switch is on during initial start-up. In addition, it would be advantageous for the power supply and method to improve the overall efficiency of the power supply.

DETAILED DESCRIPTION OF THE DRAWINGS

Generally, the present invention provides a circuit and method for operating a power supply. In particular, the present invention provides a soft start circuit for reducing the on-time of a power switch of the power supply during initial start-up. This is accomplished by limiting the duty cycle of the power switch such that the power switch is preferably turned off for a larger percentage of time than it is turned on. This can prevent transformer saturation and failure of the power switch during start-up. In addition, the present invention provides a duty cycle detector circuit for reducing the power consumption of the power supply when a load at the output of the power supply draws little or no power.

Figure 1:
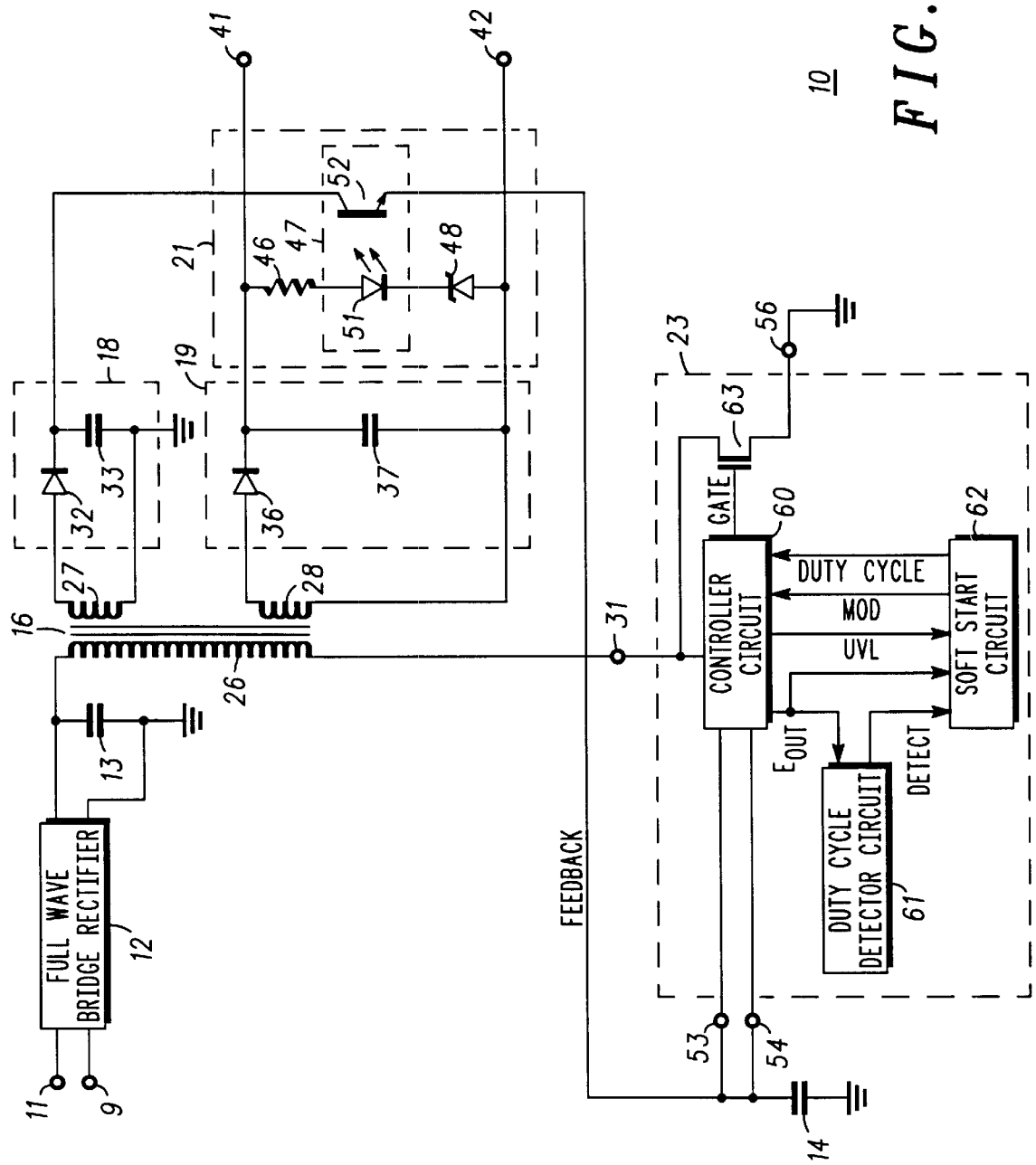
FIG. 1 is a schematic diagram of a power supply.

FIG. 1 is a schematic diagram of a power supply 10 in accordance with the present invention. Power supply 10 includes a full-wave bridge rectifier 12, capacitors 13 and 14, a transformer 16, peak rectifiers 18 and 19, a coupling circuit 21, and a power converter circuit 23. In particular, full-wave bridge rectifier 12 has a pair of input terminals 9 and 11 for receiving an AC voltage and a ground connection for receiving a power supply voltage or source of operating potential such as, for example, ground potential. An output of full-wave bridge rectifier 12 supplies a rectified output signal that is filtered by filter capacitor 13. Filter capacitor 13 has a first terminal connected to the output of full-wave bridge rectifier 12 and a second terminal coupled for receiving a source of operating potential.

Transformer 16 has a primary side or winding 26 having two terminals, a secondary winding 27 having two terminals, and a secondary winding 28 having two terminals. In particular, the first terminal of primary winding 26 is connected to the output of full-wave bridge rectifier 12, and the second terminal of primary winding 26 is connected to a switch pin 31 of power converter circuit 23.

Peak rectifier 18 is comprised of a diode 32 having an anode and a cathode and a capacitor 33 having two terminals. The first terminal of secondary winding 27 is connected to the anode of a diode 32 and the second terminal of secondary winding 27 is coupled for receiving a source of operating potential such as, for example, ground potential. A cathode of diode 32 is connected to a first terminal of capacitor 33. The second terminal of capacitor 33 is coupled for receiving a source of operating potential such as, for example, ground potential.

Peak rectifier 19 is comprised of a diode 36 having an anode and a cathode and a capacitor 37 having two terminals. The anode of diode 36 is connected to the first terminal of secondary winding 28 and the cathode of diode 36 is commonly connected to the first terminal of capacitor 37 and to a terminal 41. The second terminal of capacitor 37 is commonly connected to the second terminal of secondary winding 28 and to a terminal 42. It should be noted that terminals 9 and 11 serve as input terminals of power supply 10 and terminals 41 and 42 serve as the output terminals of power supply 10.

Coupling circuit 21 is comprised of a resistor 46, an opto-coupler 47, and a Zener diode 48. Opto-coupler 47 is comprised of a Light Emitting Diode (LED) 51 and a photo transistor 52. A first terminal of resistor 46 is connected to terminal 41. An anode of LED 51 is connected to the second terminal of resistor 46 and a cathode of LED 51 is connected to a cathode of Zener diode 48. An anode of Zener diode 48 is connected to terminal 42. A first conduction electrode of transistor 52 is commonly connected to the cathode of diode 32 and to the first terminal of capacitor 33. A second conduction electrode of transistor 52 is commonly connected to the first terminal of capacitor 14, a bias pin 53 of power converter circuit 23, and a feedback pin 54 of power converter circuit 23. Capacitor 14 provides a bias voltage for supplying operating power to power converter circuit 23, through pin 53 by virtue of photo transistor 52.

By way of example, power converter circuit 23 is a power supply integrated circuit or a power conversion integrated circuit having four electrical connection terminals: (1) switch pin 31, (2) bias pin 53, (3) feedback pin 54, (4) and a ground pin 56. It should be noted that bias pin 53 is not a limitation of the present invention. Alternatively, a single feedback/bias pin can be used in place of pins 53 and 54.

Power converter circuit 23 includes a controller circuit 60, a duty cycle detector circuit 61, a soft start circuit 62, and a power switch 63.

Controller circuit 60 has a first input connected to bias pin 53, a second input connected to feedback pin 54, a third input connected to switch pin 31, a fourth input for receiving a modifying signal (MOD), and a fifth input for receiving a duty cycle control signal (DUTY CYCLE). In addition, controller circuit 60 has a first output for providing an error output signal (EOUT), a second output for providing an undervoltage lockout signal (UVL), and a third output for providing a gate signal (GATE). Signal GATE is a pulse width modulated signal having a duty cycle and a frequency.

Duty cycle detector circuit 61 has an input coupled for receiving signal EOUT and an output for providing a duty cycle detect signal (DETECT).

Soft start circuit 62 has a first input connected to the first output of controller circuit 60 for receiving signal EOUT, a second input connected to the second output of controller circuit 60 for receiving signal UVL, and a third input connected to the output of duty cycle detector circuit 61 for receiving signal DETECT. In addition, soft start circuit 62 has a first output connected to the fourth input of controller circuit 60 for providing signal MOD and a second output connected to the fifth input of controller circuit 60 for providing signal DUTY CYCLE.

Switch 63 is an n-channel Field Effect Transistor (FET) having a gate electrode coupled for receiving signal GATE, a drain electrode connected to switch pin 31, and a source electrode coupled for receiving a source of operating potential such as, for example, ground potential. Although switch 63 is shown as a FET, this is not a limitation of the present invention. For example, switch 63 can be a bipolar transistor. It should be noted that the gate electrode of a FET is referred to as a control electrode and the drain and source electrodes of a FET are referred to as current carrying electrodes or conduction electrodes. Likewise, the base of a bipolar transistor is referred to as the control electrode and the collector and emitter electrodes of the bipolar transistor are referred to as conduction electrodes. Similarly, the gate electrode of a FET can be referred to as a control terminal and the drain and source electrodes of a FET can be referred to as drain and source terminals for conducting current.

In operation, full-wave bridge rectifier 12 rectifies the AC voltage received at terminals 9 and 11 and provides a rectified output signal that is filtered by capacitor 13. Peak rectifier 19 receives and rectifies a signal from secondary winding 28 to provide a DC output signal at the output of power supply 10, i.e., at terminals 41 and 42. The DC output signal can be used to supply operating power to electronic systems such as televisions, cable converters, computer monitors, video cassette recorders (VCRs), battery chargers, computer printers, etc.

Coupling circuit 21 provides a feedback signal (FEEDBACK) to power converter circuit 23 that is proportional to the DC output signal. The output of power supply 10 is optically coupled to power converter circuit 23 by opto-coupler 47. This provides electrical isolation between the output of power supply 10 and circuitry coupled to the primary side of transformer 16. The output of power supply 10 may also be magnetically or mechanically coupled to power converter circuit 23. Peak rectifier 18 receives and rectifies a signal from secondary winding 27 to provide a bias signal to photo transistor 52.

Controller circuit 60 controls the duty cycle of switch 63. In particular, signal FEEDBACK is used by controller circuit 60 for altering the pulse width of signal GATE which is supplied to the control electrode of switch 63. Thus, the pulse width of the output signal at switch output pin 31 is altered in accordance with the voltage developed across terminals 41 and 42. The variable pulse width of the output signal at pin 31 modifies the inductor current in transformer 16, thereby regulating the voltage of the DC output signal. Hence, the inductor current is controlled during power conversion by generating signal GATE in response to signal FEEDBACK.

Signal EOUT is generated in accordance with signal FEEDBACK. Signal EOUT is an error signal used to adjust the duty cycle of signal GATE. The magnitude of signal EOUT is a function of the magnitude of signal FEEDBACK. For example, the magnitude of signal EOUT is directly proportional to the magnitude of signal FEEDBACK.

Controller circuit 60 monitors the energy stored in capacitor 14 to determine if there is sufficient voltage at bias pin 53 for operating power converter circuit 23. Controller circuit 60 sets the logic value of signal UVL in accordance with the voltage at feedback pin 54. For example, controller circuit 60 monitors the bias voltage at pin 54. If the voltage at feedback pin 54 is lower than a predetermined threshold voltage then signal UVL is set to a logic low voltage. Conversely, if the voltage at feedback pin 54 is greater than a predetermined threshold voltage then signal UVL is set to a logic high voltage.

During initial start-up, soft start circuit 62 cooperates with controller circuit 60 to control the duty cycle of signal GATE. Soft start circuit 62 processes signals EOUT and UVL and generates signal DUTY CYCLE for modifying the duty cycle of signal GATE. For example, controller circuit 60 and soft start circuit 62 set the duty cycle of signal GATE to a predetermined minimum duty cycle, wherein the pulse widths of signal GATE are relatively short. Circuits 60 and 62 gradually increase the duty cycle of signal GATE from the predetermined minimum duty cycle towards a predetermined maximum duty cycle. This process of starting signal GATE at a predetermined minimum duty cycle and gradually increasing it towards a predetermined maximum duty cycle during initial start-up prevents transformer saturation and excessive heating of switch 63 and potential failure of switch 63.

After initial start-up, i.e., when the voltage across terminals 41 and 42 reaches a sufficient voltage level for supplying operating power to an external load (not shown), power converter circuit 23 monitors signal FEEDBACK from opto-coupler 47 to regulate the voltage across terminals 41 and 42. When the voltage across terminals 41 and 42 rises above a predetermined threshold voltage level, the magnitude of signal FEEDBACK from opto-coupler 47 increases and circuits 60 and 62 decrease the duty cycle of signal GATE. Hence, switch 63 stays on for a shorter period of time and the voltage across terminals 41 and 42 is reduced. When the voltage across terminals 41 and 42 falls below a predetermined threshold voltage level, the magnitude of signal FEEDBACK from opto-coupler 47 decreases and circuits 60 and 62 increase the duty cycle of signal GATE. This results in switch 63 staying on for a longer period of time and the voltage across terminals 41 and 42 is increased.

Duty cycle detector circuit 61 increases the efficiency of power supply 10 by reducing the power consumption of power converter circuit 23 when a load (not shown) at the output of power supply 10 draws little or no power or is in a stand-by mode of operation. Power converter circuit 23 enters a low load mode of operation when the load at the output of power supply 10 draws little power or is removed. An example of low load mode of operation is when a computer printer (not shown) that is coupled to the output of power supply 10 is not printing and draws little power.

Duty cycle detector circuit 61 monitors signal EOUT from controller circuit 60 to determine when signal GATE is at or near the predetermined minimum duty cycle. Duty cycle detector circuit 61 asserts signal DETECT which causes soft start circuit 62 to assert signal MOD. Signal MOD is received by controller circuit 60 for modifying signal GATE.

Preferably, duty cycle detector circuit 61 alters the frequency of signal GATE while maintaining a fixed on-time that is representative of the predetermined minimum duty cycle. This changes the mode of operation of power converter circuit 23 from the normal mode of operation wherein signal GATE has a variable duty cycle and fixed frequency to a low load mode of operation wherein signal GATE has a fixed on-time and variable frequency. In other words, during the low load mode of operation, the pulse width of signal GATE remains fixed as the frequency of signal GATE is varied. By lowering the frequency of signal GATE, switch 63 switches on and off less frequently when signal GATE is at or near the predetermined minimum duty cycle. Thus, power converter circuit 23 consumes and delivers less power.

Figure 2:
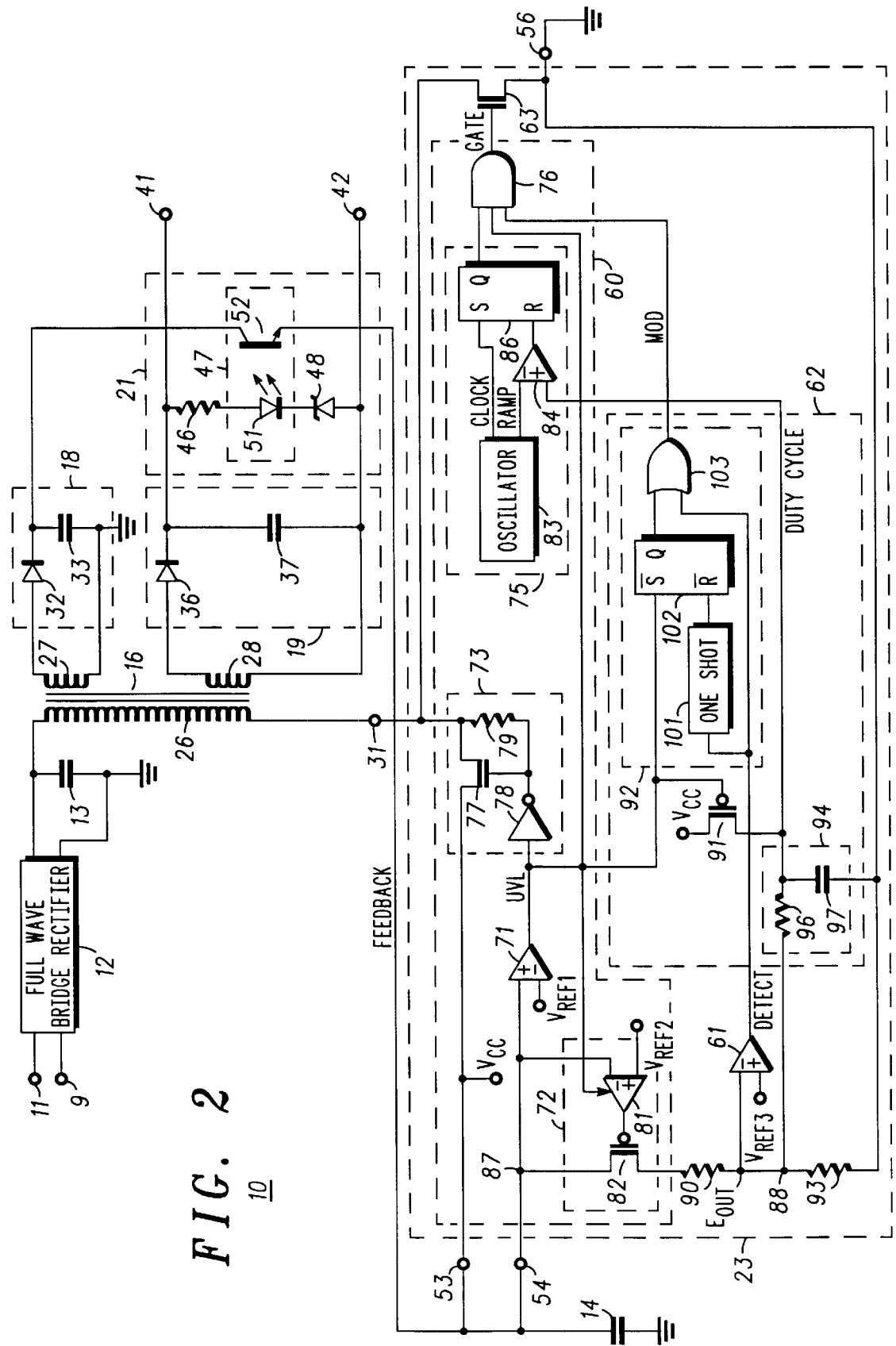
FIG. 2 is a more detailed schematic diagram of the power supply of FIG. 1.

FIG. 2 is a more detailed schematic diagram of power supply 10 in accordance with an embodiment of the present invention. It should be understood that the same reference numerals are used in the figures to denote the same elements.

By way of example, controller circuit 60 comprises a comparator 71, a shunt regulator 72, a start-up circuit 73, a pulse width modulator (PWM) 75, and a logic gate 76. In this example, logic gate 76 is an AND gate.

Start-up circuit 73 has a transistor 77, an inverter 78, and a resistor 79. Transistor 77 is an n-channel FET having a source electrode connected to bias pin 53, a drain electrode commonly connected to switch pin 31 and to the first terminal of resistor 79, and a gate electrode commonly connected to the output of inverter 78 and to the second terminal of resistor 79. The input of inverter 78 is connected to the output of comparator 71. The noninverting input of comparator 71 is connected to pin 54 and the inverting input of comparator 71 is coupled for receiving a bias reference voltage ($V_{REF1}$).

Comparator 71 includes hysteresis and is referred to as an undervoltage lockout (UVL) comparator. Comparator 71 compares an input voltage at its noninverting input to the bias reference voltage $V_{REF1}$ at its inverting input to generate a compare signal at its output. For example, comparator 71 has first and second threshold voltage levels of 9 volts and 7.5 volts, respectively. When the voltage at the noninverting input of comparator 71 exceeds the first threshold voltage level of comparator 71, i.e., 9 volts, the output of comparator 71 is at a logic high voltage. The output of comparator 71 remains at a logic high voltage until the voltage at the noninverting input of comparator 71 falls below the second threshold voltage level of comparator 71, i.e., 7.5 volts. In other words, the output of comparator 71 switches from a logic low voltage to a logic high voltage when the voltage at the noninverting input of comparator 71 rises above the first threshold voltage of 9.0 volts and switches from a logic high voltage to a logic low voltage when the voltage at the noninverting input of comparator 71 falls below the second threshold voltage of 7.5 volts. The output of comparator 71 provides signal UVL.

Shunt regulator 72 includes an amplifier 81 and a shunt transistor 82. By way of example, amplifier 81 is a comparator and transistor 82 is a p-channel FET. Although transistor 82 is shown as a FET, this is not a limitation of the present invention. For example, transistor 82 can be a bipolar transistor or any other means to perform a controlled variable resistor between nodes 87 and 88. Amplifier 81 has an enable input connected to the output of comparator 71, an inverting input connected to pin 54, a noninverting input coupled for receiving a bias reference voltage ($V_{REF2}$), and an output connected to a gate electrode of FET 82. The source electrode of FET 82 is connected to pin 54 to form node 87. The drain electrode of FET 82 provides signal EOUT. Signal EOUT is a signal generated by passing current from pin 54 to a shunt resistor 93 via a current limiting resistor 90. As the current shunted by shunt regulator 72 increases, the voltage level of signal EOUT increases and vice versa.

Resistor 90 has a first terminal connected to the drain of FET 82 and a second terminal connected to a first terminal of resistor 93 to form node 88. The second terminal of resistor 93 is connected to pin 56.

Amplifier 81 has a threshold voltage level of, for example, 8.5 volts. When the voltage at the inverting input of amplifier 81 is less than the threshold voltage level of amplifier 81, i.e., 8.5 volts, the output of amplifier 81 is at a logic high voltage. On the other hand, when the voltage at the inverting input of amplifier 81 is greater than the threshold voltage level of amplifier 81, i.e., 8.5 volts, the output of amplifier 81 is at a logic low voltage. In this example, when the voltage at the enable input of amplifier 81 is at a logic low voltage, amplifier 81 is disabled and the output of amplifier 81 is at a logic high voltage. Otherwise, when the voltage at the enable input of amplifier 81 is at a logic high voltage, amplifier 81 is enabled and the voltage at the output of amplifier 81 is dependent upon the voltage at its inverting input. Preferably, the threshold voltage level of amplifier 81 is less than the first threshold voltage level of comparator 71.

PWM 75 includes an oscillator 83, a comparator 84, and a flip-flop 86. Oscillator 83 has a first output connected to an input S of flip-flop 86 and a second output connected to the inverting input of comparator 84. The first output of oscillator 83 provides a clock signal (CLOCK) to the input S of flip-flop 86 and the second output of oscillator 83 provides a sawtooth waveform signal (RAMP) to the inverting input of comparator 84. Signal CLOCK is a rectangular wave signal having a fixed duty cycle and frequency. Signal RAMP is a sawtooth waveform having a fixed frequency. The output of comparator 84 is connected to the input R of flip-flop 86. The noninverting input of comparator 84 serves as the input of PWM 75 and the output Q of flip-flop 86 serves as the output of PWM 75. The output of PWM 75 provides a pulse width signal that controls the pulse widths of signal GATE.

It should be noted that when a signal having a logic high voltage is received at the input S of flip-flop 86, a signal at the output Q of flip-flop 86 has a logic high voltage. In addition, when a signal having logic high voltage is received at the input R of flip-flop 86, a signal at the output Q of flip-flop 86 has a logic low voltage. Should flip-flop 86 receive both a signal having a logic high voltage at the input R and a signal having a logic high voltage at the input S, flip-flop 86 responds to the signal received at the input S. In other words, when both a set and a reset occur together, the set function has precedence.

The first input of AND gate 76 is connected to the output Q of flip-flop 86, the second input of AND gate 76 is connected to the output of comparator 71 for receiving signal UVL, and the third input of AND gate 76 is connected to an output of soft start circuit 62 for receiving signal MOD. The output of AND gate 76 is connected to the gate electrode of switch 63 for providing signal GATE.

Duty cycle detector circuit 61 is a comparator having an inverting input connected to the second terminal of resistor 90 for receiving signal EOUT and a noninverting input coupled for receiving a bias reference voltage ($V_{REF3}$). The output of comparator 61 is connected to the third input of soft start circuit 62 for providing signal DETECT. Preferably, the bias reference voltage $V_{REF3}$ is a voltage corresponding to a threshold voltage approximately equal to the peak voltage of the sawtooth waveform signal RAMP. For example, if the peak voltage of signal RAMP is 3.5 volts, then voltage $V_{REF3}$ is chosen so that the threshold voltage of comparator 61 is 3.5 volts.

In this example, when the voltage at the inverting input of comparator 61 is less than the threshold voltage level of comparator 61, i.e., 3.5 volts, the output of comparator 61 is at a logic high voltage. On the other hand, when the voltage at the inverting input of comparator 61 is greater than the threshold voltage level of comparator 61, i.e., 3.5 volts, the output of comparator 61 is at a logic low voltage.

Soft start circuit 62 includes a pre-charge transistor 91, an interface circuit 92, and a filter 94. By way of example, transistor 91 is a p-channel FET. Filter 94 has a resistor 96 and a capacitor 97. The first terminal of resistor 96 is connected to node 88 for receiving signal EOUT. The first terminal of capacitor 97 is commonly connected to the second terminal of resistor 96, a drain electrode of FET 91, and the noninverting input of comparator 84 and the second terminal of capacitor 97 is connected to ground pin 56. The gate electrode of FET 91 is connected to the output of comparator 71 for receiving signal UVL and the source electrode of FET 91 is coupled for receiving a source of operating potential such as, for example, Vcc.

Interface circuit 92 includes a one shot 101, a flip-flop 102, and an OR gate 103. Flip-flop 102 has an active low input $\overline{S}$ connected to the output of comparator 71, an active low input $\overline{R}$ connected to the output of one shot 101, and an output Q connected to a first input of OR gate 103. The input of one shot 101 is commonly connected to the output of comparator 61 and the second input of OR gate 103. The output of OR gate 103 is connected to the third input of AND gate 76 for providing signal MOD.

When a signal having a logic low voltage is received at the input $\overline{S}$ of flip-flop 102, a signal at the output Q of flip-flop 102 has a logic high voltage. In addition, when a signal having a logic low voltage is received at the input $\overline{R}$ of flip-flop 102, a signal at the output Q of flip-flop 102 has a logic low voltage. Should flip-flop 102 receive both a signal having a logic low voltage at the input $\overline{R}$ and a signal having a logic low voltage at the input $\overline{S}$, flip-flop 102 responds to the signal received at the input $\overline{S}$. In other words, when both a set and a reset occur together, the set function has precedence.

One shot 101 generates a negative pulse having a predetermined pulse width when it senses a positive edge, i.e., a low to high transition, of signal DETECT at its input from comparator 61.

At initial start-up, capacitor 14 is initially discharged and power converter circuit 23 is off, i.e., switch 63 is not being turned on and off. Primary winding 26 provides a low resistance path and resistor 79 provides a bias voltage for turning on transistor 77. Transistor 77 provides current for charging capacitor 14. Capacitor 14 is referred to as a bias capacitor since it provides bias voltage Vcc to power converter circuit 23.

Comparator 71 compares bias voltage Vcc to reference voltage $V_{REF1}$ to provide a compare signal, i.e., signal UVL. As capacitor 14 charges from a voltage level of zero volts to a voltage level equal to the first threshold voltage level of comparator 71, i.e., 9.0 volts, the output of comparator 71 is at a logic low voltage. Thus, signal UVL is at a logic low voltage. When signal UVL is at a logic low voltage, the gate electrode of transistor 77 is at a logic high voltage which causes transistor 77 to remain on and charge capacitor 14, thereby increasing bias voltage Vcc.

In addition, signal UVL at a logic low voltage disables amplifier 81 which causes the output of amplifier 81 to be at a logic high voltage, thereby turning off FET 82. As a result, no current is shunted or passed from pin 54 to shunt resistor 93.

Signal UVL is also transmitted to the second input of AND gate 76 which causes signal GATE to be at a logic low voltage. Thus, the output signal from the output of PWM 75 is not passed through AND gate 76 and is effectively blocked or inhibited. Switch 63 is off since signal GATE is at a logic low voltage. In other words, when signal UVL is at a logic low voltage, the output signal of PWM 75 is blocked after AND gate 76 receives signal UVL, thereby inhibiting signal GATE.

Although element 76 is shown as an AND gate, this is not a limitation of the present invention. In an alternate embodiment, AND gate 76 can be replaced by any element or combination of elements for the purpose of blocking the output signal from the output of PWM 75 in accordance with signals MOD and UVL. For example, AND gate 76 can be replaced by a comparator.

In addition, when signal UVL is at a logic low voltage, FET 91 of soft start circuit 62 is on and provides bias voltage Vcc to charge capacitor 97. Further, the output Q of flip-flop 102 is latched at a logic high voltage which sets signal MOD to a logic high voltage. This has no effect on signal GATE since signal UVL, received at the second input of AND gate 76, is at a logic low voltage.

When the voltage at pin 54 is greater than the first threshold voltage level of comparator 71, i.e., 9 volts, the output of comparator 71 switches from a logic low voltage to a logic high voltage. Hence, signal UVL is at a logic high voltage and amplifier 81 is enabled which means that shunt regulator 72 is enabled.

After amplifier 81 receives signal UVL having a logic high voltage, amplifier 81 compares bias voltage Vcc to reference voltage $V_{REF2}$ to provide a compare signal to the gate electrode of FET 82. FET 82 passes a control signal from node 87 to node 88 after receiving the compare signal from amplifier 81. For example, shunt regulator 72 senses that the voltage at pin 54 is at 9 volts. Since the voltage at pin 54 is at 9 volts and the threshold voltage level of amplifier 81 is 8.5 volts, FET 82 is on and current from the discharging of capacitor 14 is passed from node 87 to node 88 via FET 82.

The voltage developed across resistor 93 corresponds to the error signal EOUT. Signal EOUT is used to adjust the threshold voltage level of comparator 84 of PWM 75 which in turn controls the duty cycle of signal GATE. The duty cycle of signal GATE decreases as the voltage at the input of PWM 75 increases. On the other hand, the duty cycle of signal GATE increases as the voltage at the input of PWM 75 decreases. Therefore, the duty cycle of signal GATE is altered in accordance with the magnitude of the current from the discharging of capacitor 14 after the current is passed from node 87 to node 88.

Filter 94 filters signal EOUT to attenuate any switching noise that may be present in signal EOUT and reduces the possibility of output pulse width jitter. This improves the stability of power supply 10. As an example, filter 94 is a single pole, low pass filter, having a cutoff frequency of approximately 7 kiloHertz (kHz).

In this embodiment, the duty cycle of signal GATE is set to a minimum duty cycle when pin 54 is at 9 volts. In other words, the current supplied to resistor 93 is at a maximum level when pin 54 is at 9 volts and the threshold voltage level of amplifier 81 is at 8.5 volts which results in the duty cycle of signal GATE operating at a predetermined minimum duty cycle.

As capacitor 14 discharges from a voltage level of approximately 9 volts to a voltage level of approximately 8.5 volts, the current shunted to resistor 93 decreases from a maximum level to a minimum level. This causes the voltage provided to the input of PWM 75 to decrease and the duty cycle of signal GATE to transition from the predetermined minimum duty cycle toward a predetermined maximum cycle level. The ramping up of the duty cycle of signal GATE from the predetermined minimum duty cycle towards the predetermined maximum duty cycle during initial start-up is referred to as a soft start mode of operation. During this time, switch 63 is switching, i.e., it is being turned on and off by the pulses of signal GATE, and the voltage across terminals 41 and 42 rises from zero volts and charges a load (not shown) connected across terminals 41 and 42.

When the voltage at pin 54 reaches the threshold voltage level of shunt regulator 72, i.e., 8.5 volts, power converter circuit 23 exits its soft start mode of operation and enters its normal mode of operation, wherein power converter circuit 23 regulates the output voltage across terminals 41 and 42. Opto-coupler 47 provides feedback current, i.e., signal FEEDBACK, to pin 54 for regulating the duty cycle of signal GATE. Signal FEEDBACK is passed from the node 87 to node 88 after signal UVL having a logic high voltage value is received by amplifier 81. The duty cycle of signal GATE is altered in accordance with the magnitude of signal FEEDBACK after signal FEEDBACK is passed from node 87 to node 88. It should be understood that signal UVL remains at a logic high voltage until the voltage at feedback pin 54 falls below 7.5 volts since comparator 71 includes hysteresis.

The conduction path between pin 54 and the input of PWM 75 is referred to as a feedback path for providing a signal representative of signal FEEDBACK. For example, in this embodiment, the feedback path includes FET 82, resistor 90, and resistor 96.

As discussed hereinbefore, filter 94 improves the stability of power supply 10. In addition, filter 94 and FET 91 are used to ensure that the duty cycle of signal GATE begins at the predetermined minimum duty cycle. During initial start-up, as discussed hereinbefore, signal UVL is at a logic low voltage and FET 91 supplies bias current to capacitor 97 for charging capacitor 97. In other words, before a signal is passed from node 87 to node 88, FET 91 provides bias to pre-charge capacitor 97. The node formed from the connection of the drain electrode of FET 91 and the first terminal of capacitor 97 is referred to as a charging node for pre-charging the input of PWM 75.

When the voltage level of feedback pin 54 reaches 9 volts and signal UVL transitions to a logic high voltage, FET 91 has pre-charged capacitor 97 to a logic high voltage. Therefore, at the transition of signal UVL from a logic low voltage to a logic high voltage, a voltage is present at the input of PWM 75 which causes the duty cycle of signal GATE to be approximately at the predetermined minimum duty cycle. Otherwise, if capacitor 97 was not charged during the transition of signal UVL, then the voltage at the input of PWM 75 is zero volts until shunt regulator 72 is enabled. When the voltage at the input of PWM 75 is at or near zero volts, signal GATE is approximately representative of the predetermined maximum duty cycle. Thus, without pre-charging capacitor 97, signal GATE could begin at a maximum duty cycle and transition to a minimum duty cycle when amplifier 81 is enabled.

Resistor 90 provides a current limiting function such that the amount of time for the soft start mode of operation can be altered by changing the resistance of resistor 90. In other words, increasing the resistance of resistor 90 increases the amount of time it takes for the duty cycle of signal GATE to transition from the initial predetermined minimum duty cycle towards the predetermined maximum duty cycle. This is because resistor 90 limits the amount of discharge current from capacitor 14. Conversely, the amount of time it takes for the soft start mode of operation can be decreased by decreasing the resistance of resistor 90. It should be noted that other elements can be used in place of or in combination with resistor 90 to produce a current limiting circuit for altering the soft start time of power converter circuit 23. For example, resistor 90 can be replaced by other elements or combinations of elements to provide current limiting.

Similarly, the soft start time of power converter circuit 23 can be decreased by decreasing the capacitance of capacitor 14, since a smaller capacitor takes a relatively shorter amount of time to discharge with a given discharge current. On the other hand, the soft start time of circuit 23 can be increased by increasing the capacitance of capacitor 14.

Comparator 61 reduces the power consumption of power supply 10 when a load (not shown) across terminals 41 and 42 is small, removed, or is in a stand-by mode of operation. Preferably, the threshold voltage level of comparator 61 is approximately equal to the peak voltage of signal RAMP. Thus, in this example, comparator 61 detects when the duty cycle of signal GATE is approximately at the predetermined minimum duty cycle and asserts signal DETECT.

During the soft start mode of operation, signal DETECT is effectively blocked by OR gate 103 since the output Q of flip-flop 102 is set to a logic high voltage. At the beginning of the soft start mode of operation, signal UVL transitions from a logic low voltage to a logic high voltage, which causes signal EOUT to transition from a voltage level which is less than the threshold voltage level of comparator 61 to a voltage level greater than the threshold voltage level of comparator 61. This results in signal DETECT transitioning from a logic high voltage to a logic low voltage. However, as described hereinbefore, the output Q of flip-flop 102 is latched at a logic high voltage at this time causing signal MOD to remain at a logic high voltage. Thus, transitions in signal DETECT are effectively blocked during the soft start mode of operation.

During the soft start mode of operation and upon exceeding minimum duty cycle, the signal DETECT transitions from a logic low voltage to a logic high voltage. This causes one shot 101 to trigger and generate a negative pulse which results in a logic low voltage at the output Q of flip-flop 102. Thus, signal DETECT is no longer blocked.

If the load at the output of power supply 10 is removed, the current from photo transistor 52 into feedback pin 54 increases causing the voltage of signal EOUT to rise above the threshold voltage level of comparator 61. Thus, signal DETECT transitions to a logic low voltage which causes signal MOD to transition to a logic low voltage.

When signal MOD is at a logic low voltage, the output of PWM 75 is blocked by AND gate 76. Hence, positive pulses generated by PWM 75 are not transmitted from the output of PWM 75 to the output of AND gate 76. In other words, when signal EOUT exceeds the threshold voltage level of comparator 61, signal MOD is at a logic low voltage and signal GATE is inhibited. Pulses generated by PWM 75 are skipped when signal EOUT is at a voltage level greater than the threshold voltage level of comparator 61. Accordingly, the pulses of signal GATE are disabled when signal EOUT exceeds the threshold voltage level of comparator 61 and the pulses of signal GATE are enabled when signal EOUT is less than the threshold voltage level of comparator 61. As discussed hereinbefore, the magnitude of signal EOUT is dependent on the magnitude of signal FEEDBACK.

By skipping pulses, this effectively reduces the frequency of signal GATE while maintaining a fixed on-time for switch 63. In other words, switch 63 turns on and off less frequently and the on-time for switch 63 is constant. For example, signal DETECT can be toggled between a logic high voltage and a logic low voltage so that every other positive pulse from PWM 75 is blocked. This effectively divides the frequency of signal GATE by two, while the pulse widths of the pulses of signal GATE remain fixed with respect to time. Thus, when signal DETECT is toggled between a logic high and a logic low voltage, the frequency of signal GATE is altered.

The number of pulses skipped can be increased to decrease the frequency of signal GATE to a desired frequency level. Lowering the frequency of signal GATE causes switch 63 to be switched on and off less frequently. Hence, the power consumption and power delivered by power converter circuit 23 is reduced by lowering the frequency of signal GATE and maintaining a fixed on-time for switch 63 when the duty cycle of signal GATE is approximately equal to the predetermined minimum duty cycle. An advantage of this method of operating power converter circuit 23 is that the ripple voltage that appears on the output voltage across terminals 41 and 42 remains substantially constant.

By now it should be appreciated that a power converter circuit and a method for operating the power converter circuit have been provided. An advantage of the present invention is that it provides a method for operating the power converter circuit that prevents transformer saturation and potential failure of a power switch of the circuit during initial start-up. In addition, an advantage of the power converter circuit is that it is compatible with standard switching regulated power supplies. Further, the power converter circuit of the present invention is more efficient at light or no load than standard prior art switching regulated power supplies.

What is claimed is:

1. An integrated circuit, comprising
   a pulse width modulator for providing a pulse width modulated signal;
   a feedback path coupled between a feedback input of the integrated circuit and an input of the pulse width modulator, wherein the feedback path includes a charging node, wherein the feedback path includes
      a shunt transistor having a first conduction electrode coupled to the feedback input of the integrated circuit, and
      a resistor having a first terminal coupled to a second conduction electrode of the shunt transistor and a second terminal coupled to the charging node; and
   a pre-charge circuit having an output coupled to the charging node for sourcing a pre-charge current to the charging node.

2. The integrated circuit of claim 1, wherein the pre-charge circuit includes a transistor having a control electrode coupled for receiving a pre-charge control signal, a first conduction electrode coupled for receiving a source of operating potential, and a second conduction electrode coupled to the charging node.

3. The integrated circuit of claim 1, further including:
   a comparator having a first input coupled to the feedback input of the integrated circuit, a second input coupled for receiving a first reference signal, and an output coupled to the control electrode of the pre-charge transistor; and
   an amplifier having a first input coupled to the feedback input of the integrated circuit, a second input coupled for receiving a second reference signal, a third input coupled to the output of the comparator, and an output coupled to a control electrode of the shunt transistor.

4. A power conversion control circuit, comprising:
   a regulator coupled for receiving a feedback signal to provide a switched drive control signal operating between a minimum and maximum on-time;
   a detector having an input coupled for receiving the feedback signal and providing a detect signal when the feedback signal exceeds a threshold representing a predetermined duty cycle of the switched drive control signal; and
   a control circuit having an input coupled for receiving the detect signal, wherein the control circuit disables the switched drive control signal in response to the detect signal to reduce power transfer by the power conversion control circuit.

5. The integrated circuit of claim 4, wherein the regulator comprises:
   an oscillator having a first output coupled to provide a first signal and a second output coupled to provide a second signal;
   a comparator having a first input coupled to receive the second signal and a second input coupled to receive the feedback signal; and
   a memory storage device having a first input coupled to receive the first signal and a second input coupled to receive an output of the comparator and an output coupled to provide the switched drive control signal.

6. The power conversion control circuit of claim 4, wherein the detector further includes a second input coupled to receive a reference signal representing the predetermined duty cycle of the switched drive control signal.

7. A power conversion control circuit providing a drive control signal, comprising:

a detector having a first input coupled for receiving a feedback signal, a second input coupled for receiving a reference signal representing a predetermined duty cycle of the drive control signal, and an output providing a detect signal; and a gating circuit coupled for receiving the detect signal wherein the gating circuit disables the drive control signal in response to the detect signal to reduce power transfer by the integrated circuit.

8. The power conversion control circuit of claim 7 wherein the gating circuit comprises:

a memory storage device having a first input coupled to receive a control signal and having an output activating the detect signal in response to the control signal; and a logic gate having a first input coupled to receive the output of the memory storage device and a second input for receiving the detect signal.

9. An integrated circuit, comprising:

a pulse generator for regulating an output voltage with pulses having duty cycles determined by an error signal; and a first comparator for comparing the error signal with a reference signal representing a threshold duty cycle of the pulses, and having an output for disabling the pulse generator.

10. The integrated circuit of claim 9, wherein a feedback signal derived from the output voltage is received at an external lead of the integrated circuit, further comprising a shunt regulator coupled to the external lead to provide an internal supply voltage of the integrated circuit.

11. The integrated circuit of claim 10, wherein the feedback signal is routed through the shunt regulator to develop the error signal at an input of the comparator.

12. The integrated circuit of claim 11, further comprising a filter for routing the error signal from the input of the first comparator to an input of the pulse generator as a filtered signal.

13. The integrated circuit of claim 12, wherein the pulse generator includes:

an oscillator providing a ramp signal; and a second comparator for comparing the ramp signal to the filtered signal to establish the duty cycles.

14. The integrated circuit of claim 13, wherein the oscillator generates a clock signal to initiate the pulses and the second comparator provides an output signal to terminate the pulses.

15. A method of regulating a voltage, comprising the steps of:

generating pulses to modify the voltage;

modulating the duty cycles of the pulses with an error signal to regulate the voltage; and comparing the error signal to a reference signal representing a threshold duty cycle of the pulses to terminate the step of generating in response to the error signal indicating a duty cycle less than the threshold duty cycle.

16. The method of claim 15, wherein the step of modulating includes the step of generating an inductor current with the pulses to develop the voltage.

17. The method of claim 16, further comprising the steps of:

developing a feedback signal from the voltage; and routing the feedback signal through a resistance to develop the error signal.

18. The method of claim 15, wherein modulating includes the step of low pass filtering the error signal.

* * * * *